United States Patent
Ross

[11] Patent Number: 5,924,835
[45] Date of Patent: Jul. 20, 1999

[54] VEHICLE CARRIER RACK FOR PICK-UP TRUCK

[76] Inventor: Jody Ross, 253 Walnut St., Nampa, Id. 83686

[21] Appl. No.: 08/918,448

[22] Filed: Aug. 26, 1997

Related U.S. Application Data

[60] Provisional application No. 60/025,794, Aug. 26, 1996.

[51] Int. Cl.$^6$ .................................................. B60P 3/06
[52] U.S. Cl. ................ 414/462; 224/402; 296/3
[58] Field of Search ............................ 224/402; 296/3; 414/462, 537, 538; 410/24, 24.1

[56] References Cited

U.S. PATENT DOCUMENTS

| | | | |
|---|---|---|---|
| 3,550,800 | 12/1970 | Robinson | 414/462 |
| 3,589,576 | 6/1971 | Rinkle et al. | 224/42.01 |
| 3,613,920 | 10/1971 | Flamm . | |
| 3,648,866 | 3/1972 | Slown | 414/462 |
| 3,734,321 | 5/1973 | Long et al. | 414/462 |
| 3,891,262 | 6/1975 | Brunel | 296/3 |
| 3,972,433 | 8/1976 | Reed | 414/462 |
| 3,993,342 | 11/1976 | Jones et al. | 296/1 |
| 4,034,879 | 7/1977 | Cudmore | 414/462 |
| 4,057,281 | 11/1977 | Garrett | 296/3 |
| 4,138,046 | 2/1979 | De Freze | 224/42.42 |
| 4,152,020 | 5/1979 | Brown et al. | 296/3 |
| 4,239,438 | 12/1980 | Everson | 414/462 |
| 4,405,170 | 9/1983 | Raya | 296/10 |
| 4,423,899 | 1/1984 | Langmead | 296/3 |
| 4,953,757 | 9/1990 | Stevens et al. | 414/462 X |
| 5,002,324 | 3/1991 | Griffin | 296/3 |
| 5,005,892 | 4/1991 | Haugen et al. | 296/3 |
| 5,123,799 | 6/1992 | Breazeale | 414/462 |
| 5,447,408 | 9/1995 | Smith | 414/462 X |

*Primary Examiner*—Janice L. Krizek
*Attorney, Agent, or Firm*—Ken J. Pedersen; Barbara S. Pedersen

[57] ABSTRACT

The invention is a simple and convenient carrier structure for transporting 2 (two) or more ATVs or snowmobiles on a standard-sized pick-up truck. The carrier has a frame which is adapted to be secured on the box, or bed of the pick-up. The front of the frame is cantilevered to extend generally horizontally from the front of the box forward and above the cab with front decking to support a first vehicle horizontally above the pick-up cab. The back part of the carrier frame has back decking to support a second vehicle on an incline from near the top back of the cab to near the bottom back of the box. The back decking is pivotally mounted to the frame at the decking's front end, and may be supported by a rear transverse frame member also pivotally mounted to the carrier frame so that it may be raised and lowered and flipped upside-down in position to support the back decking at a variety of angles or to support a tent fabric for camping.

5 Claims, 4 Drawing Sheets

VEHICLE CARRIER RACK FOR PICK-UP TRUCK

DESCRIPTION

This application is a conversion of a prior provisional application serial no. 60/025,794, filed Aug. 26, 1996, and also entitled "Vehicle Carrier Rack for Pick-up Truck", the disclosure of which is hereby incorporated by reference.

BACKGROUND OF THE INVENTION

1. Field of the Invention

This invention relates generally to structures, known as racks, which are adapted to be secured on pick-up truck boxes for carrying other vehicles, especially all-terrain vehicles (ATVs) and snowmobiles, for example. This invention relates to a pick-up carrier rack which can enable a standard-sized pick-up to carry 2 (two) or more ATVs or snowmobiles.

2. Related Art

U.S. Pat. No. 3,589,576 (Rinkle et al.) discloses a rack for a pick-up truck which has a front portion which may pivot to extend over the cab of the pick-up.

U.S. Pat. No. 3,613,920 (Flamm) discloses an elevated deck for a pick-up truck box which supports a single snowmobile. There is a ramp engaged at the rear of the deck for loading or unloading the snowmobile. The ramp is selectively storable beneath the elevated deck.

U.S. Pat. No. 4,152,020 (Brown et al.) also discloses a rack for a pick-up truck which has a front portion which extends over the cab of the pick-up.

Still, there is a need in the pick-up truck carrier rack industry for a simple, lightweight rack which permits easy loading, unloading and transport of 2 (two) or more ATVs or snowmobiles. This invention addresses that need.

SUMMARY OF THE INVENTION

The invention is a simple and convenient carrier structure for transporting 2 (two) or more ATVs or snowmobiles on a standard-sized pick-up truck. The carrier has a frame which is adapted to be secured on the box, or bed of the pick-up. The front of the frame is cantilevered to extend generally horizontally from the front of the box forward and above the cab. The front cantilevered part of the frame has generally horizontal front decking to support a first vehicle horizontally above the pick-up cab.

The back part of the carrier frame has back decking to support a second vehicle on an incline from near the top back of the cab to near the bottom back of the box. The back decking may be supported by a rear transverse frame member, or by the back of the box itself (not shown in the Figures), or by the tail gate. The back decking is pivotally mounted to the carrier frame near the top back of the cab to allow the back decking to be pivoted upwards for easy access to the pick-up box, or to allow for supporting a tent fabric to enclose the pick-up box. The preferable, generally-U-shaped rear transverse frame member may be raised and lowered and flipped upside-down in position to support the back decking at a variety of angles or to support a tent fabric for camping.

The rear transverse frame member and the pivotal mounting of the back decking allows the back decking to be held generally horizontally by raising the rear transverse frame member, in order to support the second vehicle horizontally on a level about the same as the first front vehicle. Then, a third vehicle may be loaded into the pick-up box, beneath the back decking and second vehicle, allowing transport of three vehicles.

Stops are provided at the rear of the back decking to help secure the second vehicle on the incline. Also, additional decking may be secured to the carrier or the pick-up box or the tailgate to cooperate with the rear of the back decking for assistance in loading or unloading the transported vehicles.

DESCRIPTION OF THE PREFERRED EMBODIMENTS

Figure 1:
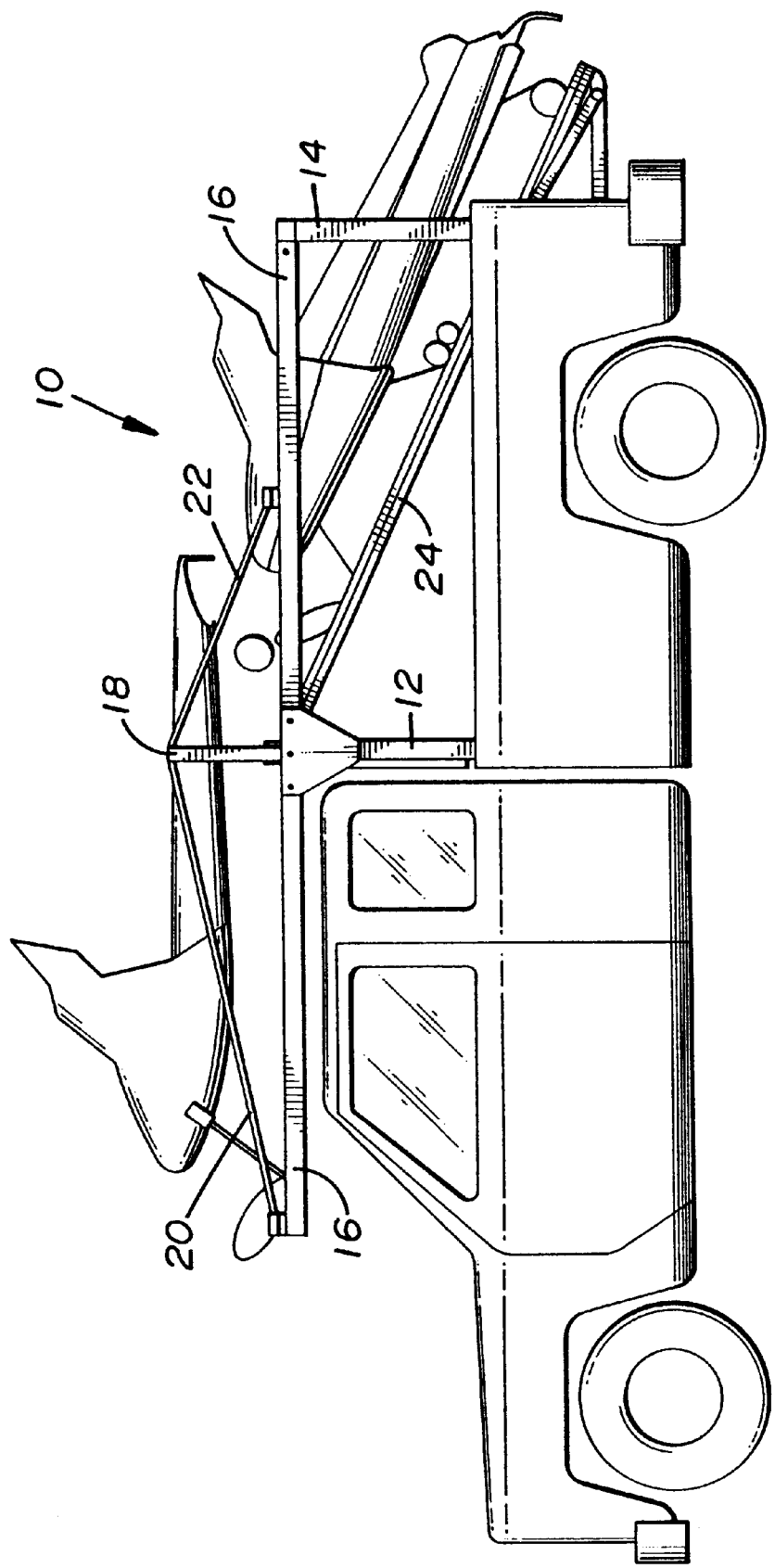
FIG. 1 is a side schematic view of one embodiment of the carrier of the invention on a pick-up truck supporting two snowmobiles.

The carrier of the invention is made with conventional materials by conventional techniques of conventional components as described in the drawings.

Referring to FIG. 1, there is depicted a side schematic view of one embodiment of the carrier of the invention 10 on a pick-up truck supporting two snowmobiles. In this view, carrier 10 comprises front vertical post 12 and rear vertical post 14 connected by horizontal bar 16. Posts 12 and 14 are preferably of rectangular steel tubing, and are secured in the standard post holes in the corners of the pick-up box. Horizontal bar 16 extends forwardly from at or near the top of rear vertical post 14 over the top of front vertical post 12 out over the front of the cab of the pick-up.

Front vertical post 12 has riser 18 extending vertically from its top end. Riser 18 supports and secures front cable 20 at the cable's rear end. Front cable 20's front end is connected and secured at or near the front end of horizontal bar 16. Riser 18 also supports and secures rear cable 22 at the cable's front end. Rear cable 22's rear end is connected and secured to horizontal bar 16 at a point approximately midway between front vertical post 12 and rear vertical post 14.

Carrier 10 has rear decking 24 connected at an incline down from near the top of front vertical post 12 to the tailgate of the pick-up truck.

Figure 2:
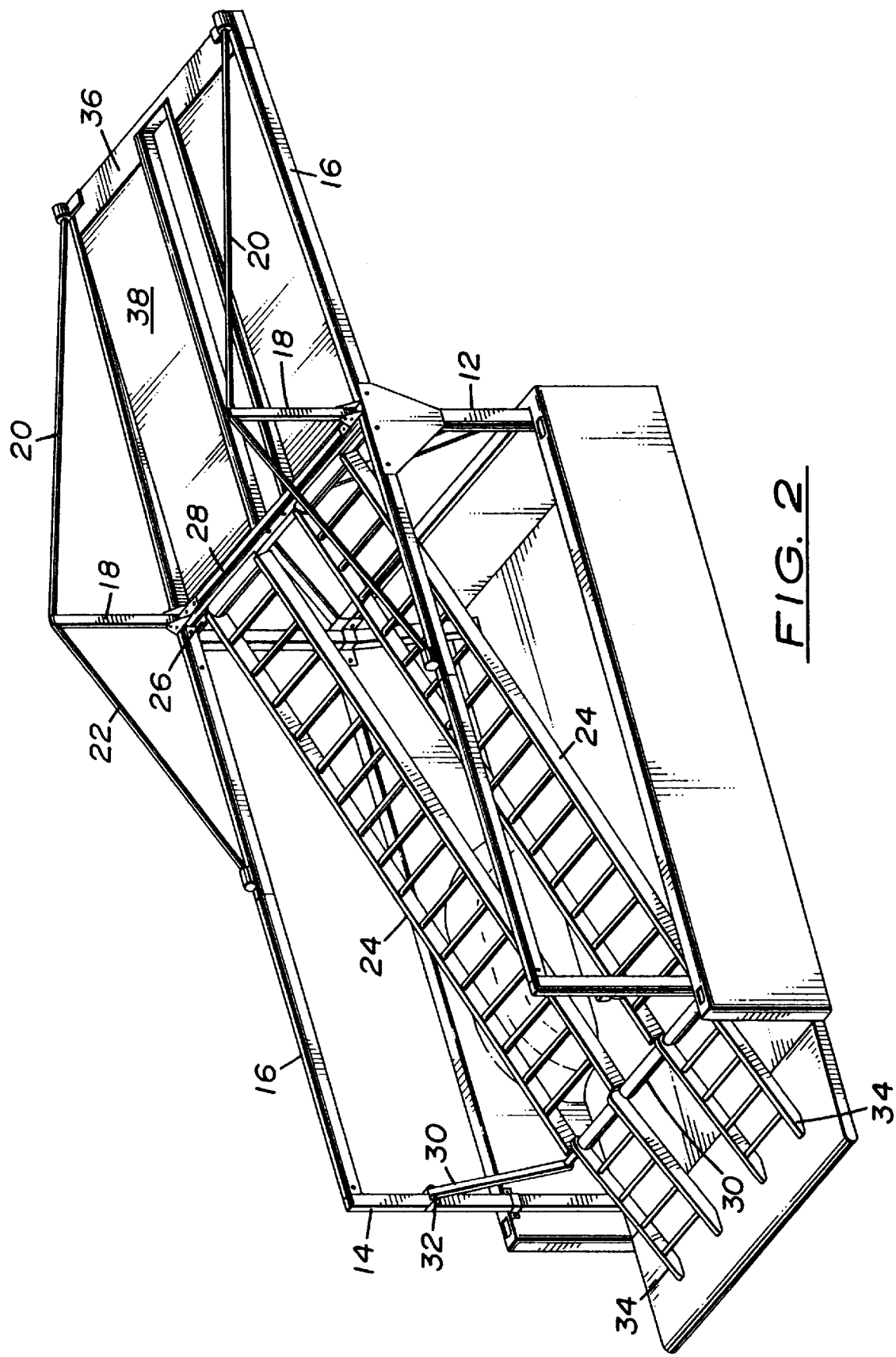
FIG. 2 is a rear perspective view of one embodiment of the carrier of the invention on a pick-up truck box.

Referring to FIG. 2, there is depicted a rear perspective view of an embodiment of the carrier 10 of the invention similar to the embodiment depicted in FIG. 1. Items identified in FIG. 1 also appear in FIG. 2, namely front vertical post 12, rear vertical post 14, horizontal bar 16, riser 18, front cable 20, rear cable 22 and rear decking 24. In the view of FIG. 2, mirror-image right and left side components are identified with the same call-out item number.

Also depicted in FIG. 2 is the front pivotal connection 26 between the front end of rear decking 24 and either horizontal bar 16 or middle transverse bar 28. That is, the front end of rear decking 24 may pivot in a hinge provided at the inside of horizontal bars 16 near the top of vertical posts 12. Or, rear decking 24 may pivot in a hinge provided at the rear of transverse bar 28. Transverse bar 28 is connected and secured between the two horizontal bars 16 for strength and stiffness.

Rear decking 24 extends rearwardly to be connected and secured to rear transverse bar 30. Preferably, rear transverse bar 30 is a generally U-shaped steel tube connected and secured between rear vertical posts 14 at a point approximately ⅔ up the length of the posts. The point of connection for rear transverse bar 30 on rear vertical posts 14 is rear pivotal connection 32. This way, rear transverse bar 30 may be raised and lowered and flipped upside-down, and the rear decking 24 may be supported at a variety of angles and heights off the floor of the pick-up truck box.

Additional rear decking 34 may be provided with its front end connected to transverse bar 30 or to the rear of rear decking 24. This way, the rear decking 24 may be stabilized by support from the additional rear decking 34 resting on the pick-up truck's tailgate as depicted in FIG. 2. Or, additional rear decking 34 may extend all the way to the ground (not shown) for allowing easy loading and unloading of vehicles to and from the rear decking 24.

At the front end of carrier 10, front transverse bar 36 extends and is secured between the front ends of horizontal bars 16. Front transverse bar 36 helps provide strength and stiffness to the front end of carrier 10, and provides support for front decking 38 which extends forwardly from middle transverse bar 28 to front transverse bar 36. The ends of front transverse bar 36 may also be optional locations for receiving and securing front cables 20.

Figure 3:
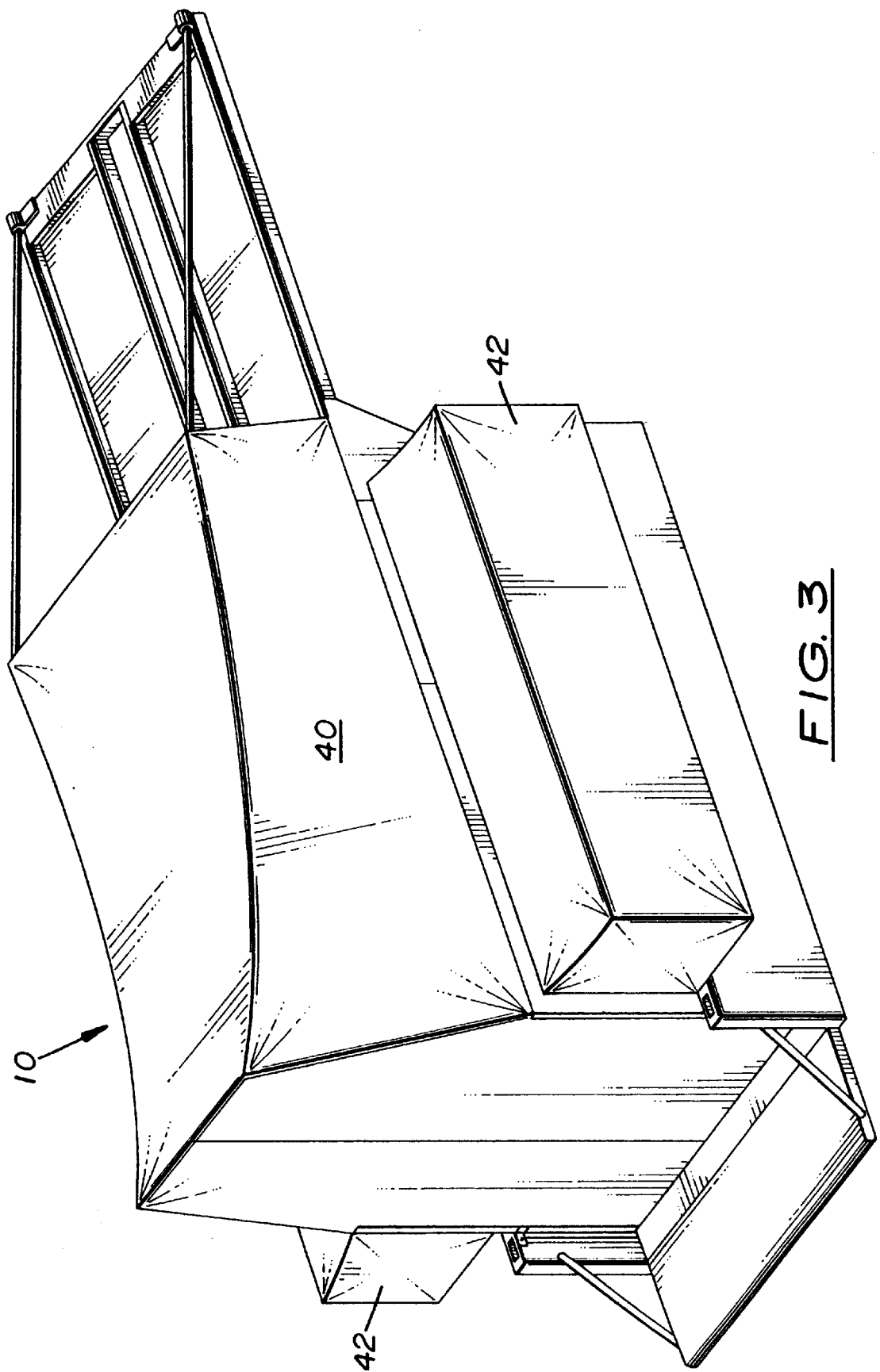
FIG. 3 is a rear perspective view of an embodiment of the invention supporting a tent fabric.

Referring to FIG. 3, there is depicted a rear perspective view of an embodiment of the carrier 10 of the invention supporting a tent fabric 40 to make a dry and cozy camping space when vehicles are unloaded from the carrier 10. The camping space includes sleeping bag boxes 42 extending from the sides of the tent fabric 40.

Figure 4:
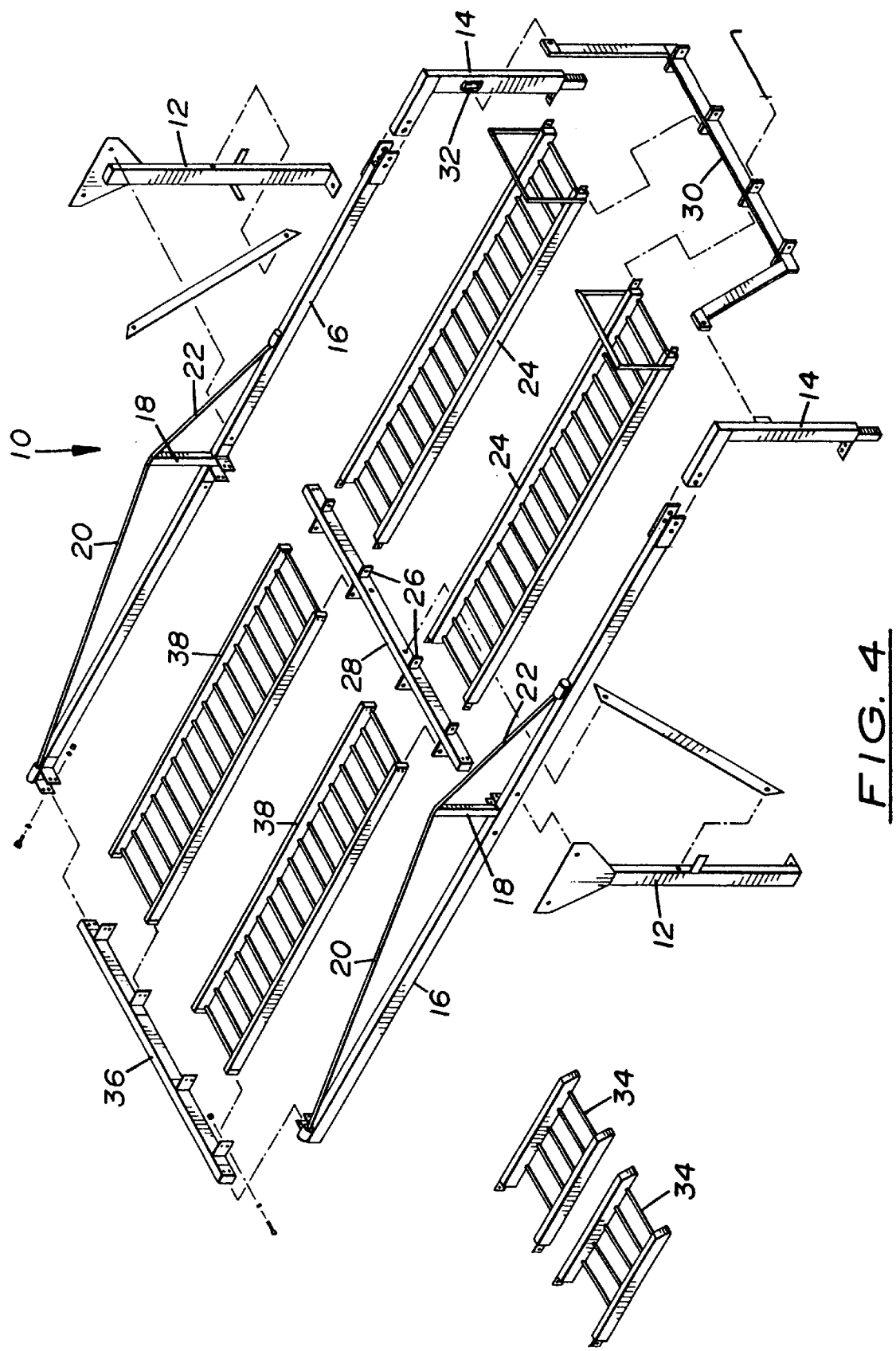
FIG. 4 is an exploded view of one embodiment of the carrier of the invention showing its pieces parts.

Referring to FIG. 4, there is depicted an exploded view of the main components of an embodiment of the carrier 10 of the invention. Manufacture and assembly of the carrier 10 is made evident from this Figure.

In use, the carrier is first secured to a standard-sized pick-up truck as depicted in the drawings. Then, the first (front) and second (back) vehicles that are to be transported, are loaded and secured on the carrier decking in respective order by conventional techniques. Optionally, a rear transverse frame member may be positioned to raise the back decking of the carrier to a generally horizontal position, for allowing a third (lower) vehicle (not shown) to be transported in the pick-up box. Optionally, the rear transverse frame member may be positioned to support the back decking and a tent for camping use.

Although this invention has been described above with reference to particular means, materials and embodiments, it is to be understood that the invention is not limited to these disclosed particulars, but extends instead to all equivalents within the scope of the following claims.

I claim:

1. A vehicle carrier rack for a pick-up truck, said pick-up truck having a cab and a standard pick-up truck box with front corners, rear corners, and a tailgate, said rack comprising:

a pair of front vertical posts which fit into the front corners of the standard pick-up truck box;

a pair of rear vertical posts which fit into the back corners of the standard pick-up truck box;

a pair of horizontal bars, each bar having a front end and a back end, and extending lengthwise forwardly from at or near the top of a rear vertical post substantially past the top of a front vertical post out over the front of the cab of the pick-up truck, each of said bars being connected to said rear and front vertical posts;

a middle transverse bar connected between and secured to said pair of horizontal bars;

a set of rear decking pivotally connected at or near its front end to said pair of horizontal bars or to said middle transverse bar at or near the top of said pair of front vertical posts, said rear decking extending rearwardly toward the tailgate of the pick-up truck.

2. The carrier rack of claim 1 which also comprises a rear transverse bar pivotally connected between said pair of rear vertical posts for supporting said rear decking at or near the decking's rear end.

3. The carrier rack of claim 1 which also comprises a set of front decking supported by a front transverse bar connected between the front ends of said pair of horizontal bars.

4. The carrier rack of claim 3 which also comprises a pair of risers, each extending vertically from the top of a front vertical post, and securing a cable for supporting the front end of a horizontal bar, the front transverse bar and the set of front decking.

5. The carrier rack of claim 1 which also comprises additional rear decking for cooperating with the rear end of said rear decking.

\* \* \* \* \*